UNITED STATES PATENT OFFICE.

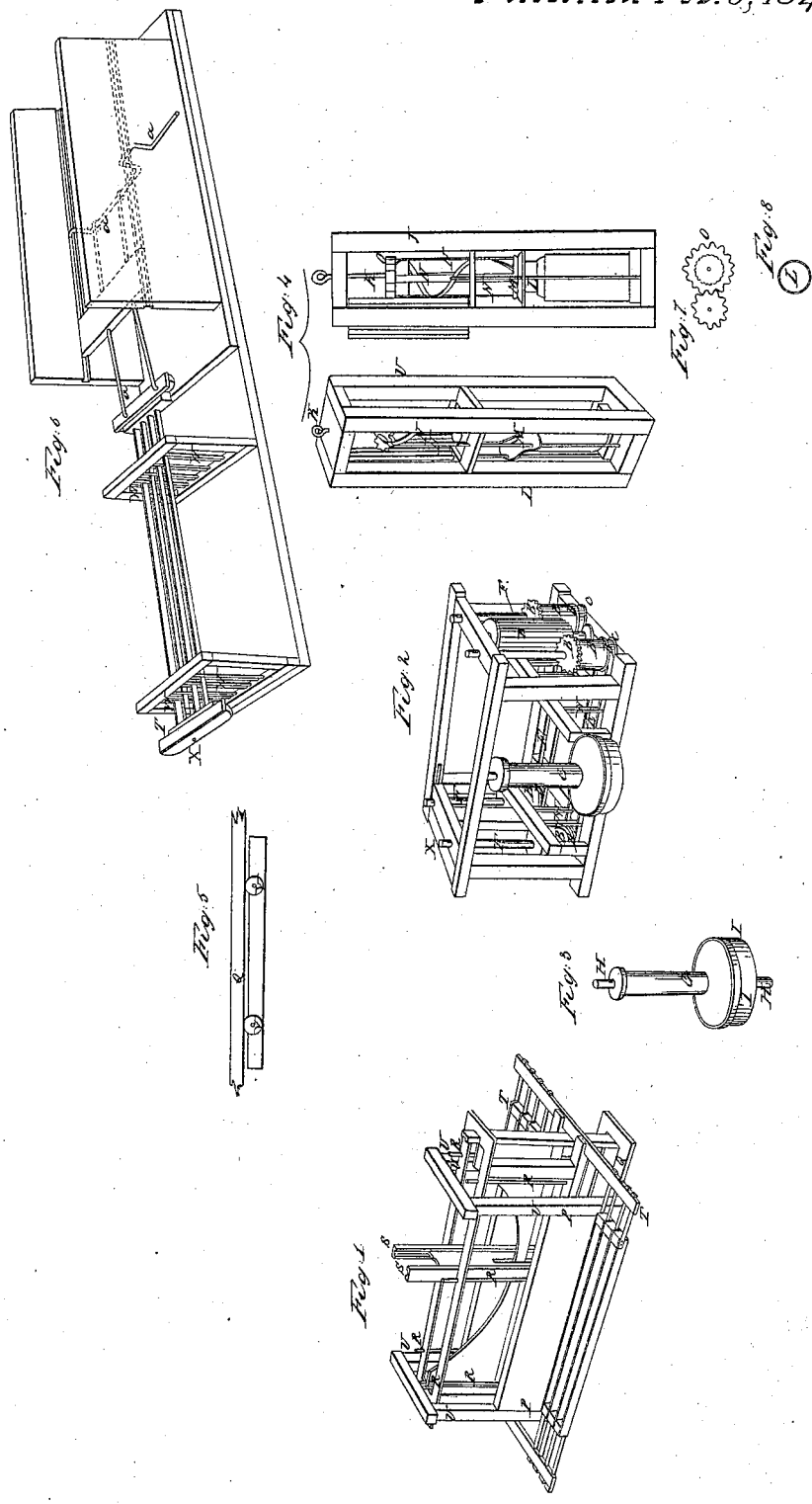

DAVID V. RANNELLS, OF WASHINGTON, KENTUCKY.

MILL FOR SAWING STONE.

Specification of Letters Patent No. 1,487, dated February 8, 1840.

*To all whom it may concern:*

Be it known that I, DAVID VANCE RANNELLS, of Washington, in the county of Mason and State of Kentucky, have invented certain new and useful Machinery for Sawing Stone, both Square and Round; and I do hereby declare that the following is a full, clear, and exact description of the construction and operation of the same, reference being had to the annexed drawings of the same, making part of this specification.

The nature of my invention consists in a certain new and useful combination of mechanical principles forming a machine for sawing rectangular pieces of stone or marble, more or less in number, from one, two, or more blocks, wherein the blades for sawing are placed in gangs parallel to each other on each side of a stationary frame in which there moves longitudinally another frame on rollers or on ways, which latter frame supports the saw frame which not only has a vibratory motion for cutting the stone but also a vertical descending movement in passing through the stone—moving backward or forward by steam or other power; also for cutting stone by means of an endless saw passing around pulleys which work loosely on stationary vertical parallel rods and descend with the saws as they enter the stone. Likewise in cutting circular blocks of stone of any length by means of a circular band saw fixed to a skeleton cylinder revolving over and around the blocks of stone to be cut which descends as the work progresses.

Figure 1, is a perspective view of the machine for sawing rectangular pieces of stone. Fig. 2 is a perspective view of the machine for sawing with endless descending saws. Fig. 3 is a perspective view of the machine for sawing round pieces of stone. Fig. 4 is a perspective view of a machine for sawing circular columns of stone. Fig. 5, section of machine showing the rollers. Fig. 6, a section representing the vertical rollers. Fig. 7, gearing of the machine for sawing columns. Fig. 8, circular saw of ditto.

Similar letters in the figures refer to similar parts.

This machine consists of several parts and is intended to represent machinery which I have invented, 1st, for sawing stone square or straight with the perpetually revolving or endless saw. This consists of a principal driver, drum, pulley, or trundle head A, Fig. 2, driven by any power at pleasure, and moving the pulley B on each side of it either by band or cog-wheel. The pulleys or drums B B are 12 inches or more in diameter. On the lower end is fastened a smooth sheet iron circular plate C extending beyond the periphery of the pulley one half an inch to prevent the saw from sliding off the pulley— also on the upper side of the saw is an iron hoop D $\frac{1}{2}$ inch square driven on to the pulley to keep the saw from running up the pulley. The pulleys at the other end of the saw frame are of similar construction but are turned by the turning of the saw. The saw E is of hoop iron or steel $\frac{1}{10}$ inch in thickness and $1\frac{1}{2}$ inch or more broad. The pulleys or drums B are from two to three feet in height and run on turned cylindrical iron shafts E of from 5 to 7 feet long and from $2\frac{1}{2}$ to 5 inches in diameter and the saws are fed by the weight sliding down the shaft.

The machinery for sawing round stone, such as grind stones, mill stones, &c., consists of a drum on pulley G Fig. 3 of similar make turning around on and descending on a similar iron shaft H and the saw I is a perfect cylinder of sheet iron of from 10 to 20 inches broad and of the diameter of the stone to be sawed. This admits of practicable dimensions to the cutting of circular stone of any diameter.

The machinery for cutting round cylindrical pillars is simple and consists of a square frame J, Fig. 4, consisting of sills and four strong upright posts more than twice the height of the pillars. These posts are framed together with broad timber a little above the middle and at the top and into the sills below; from the center of the upper end of the pillar to be cut extends to the upper end of the frame a turned shaft K at least 3 inches in diameter and from the middle cross timbers to the sills below are fixed 3 similar turned shafts.

The saw L Figs. 4 and 8, is a perfect cylinder of thin sheet iron some twelve inches broad and beveled out or flared at the upper edge some 1½ inch of it say 3/16 of an inch or a little more. On this beveled or flared part is to be fitted an iron hoop M of an inch broad and ¾ of an inch in thickness. On this hoop are fastened say 5 iron bars N 1½ inch broad and ¾ of an inch thick with screws and taps (the heads inside and countersunk) and these bars are to extend up nearly to the top of the frame and there to be firmly fastened on the lower end of a pulley or cog wheel O, which wheel is driven in all respects as the pulleys of the revolving saws &c. turn around and as it cuts and slides down the shaft K first mentioned as affixed in the top of the pillar.

Immediately below the hoop first mentioned as fastened to the upper edge of the saw must be fastened another hoop of some ¼ inch square around which is to be fixed a grooved wheel with 3 iron arms extending out to the three turned shafts mentioned, having holes in the ends of the arm to go on these shafts, down which they will slide and guide the saw as the cutting proceeds in its descending progress along the pillar. The single shaft above will direct and keep in place the cog-wheel or pulley which is connected with the moving power above.

Machinery for sawing straight or square stone with a combination of straight saws. This consists of an oblong frame P Fig. 1 of any requisite length, breadth and height, say 10 feet long 4 or 5 feet wide and of the same height with strong smooth corner pillars U Fig. 1 extending about 4 or 5 feet above the rest of the frame. In the bottom of this frame and close on the inside are fixed rollers V Fig. 5 or slide cogs (as shall be found most practically useful) on which rollers (or cogs) is laid a frame Q, Fig. 1 of strength proportioned to the work to be carried and moved and some 3 or 4 feet longer than the first frame. Into this in the middle of its side timbers (and at the ends if necessary to prevent toppling) are to be firmly fixed parallel turned guide shafts R of two, three, or even five inches in diameter extending perpendicularly upward through the lower and upper sills of the saw frame to the height of the corner posts and if necessary there may be arranged several wooden grooved fender posts S opposite the turned shaft. To the end of this frame a crank and pitman such as seen in Fig. 6 at *a* are applied. Directly on this frame and of the same length or a little longer if necessary is laid the saw frame T 4 or 5 feet in height, the turned shafts passing perpendicularly through both upper and lower sills of this frame for the purpose of guiding its descent as the sawing progresses.

At each side of each saw of both kinds that is both the straight and belt saws there are to be attached to the head block a gang of vertical rollers W such as are seen at W Figs. 6 and 2 to secure a fair unwavering cut of the saw and be the means of rolling out any little picks which the saw may have received from gravel, &c., in its transit. These rollers are to be at least one inch in diameter and to turn freely on pivots at each end. Their length will be determined by the size of the stone intended to be sawed. And it is also evident that the length and height of the machinery length of the saws, &c., must be adapted to the length and thickness of the blocks intended to be cut up by it. My machinery is intended to take as many saws as may be necessary to cut two entire blocks (one on each side) at the same time and that the saws will be fastened to the saw board at one end and drawn as usual to the other by a temper screw such as that represented at X Fig. 6 so as to give them the proper degree of tension. The revolving or belt saws E, are two one on each side making 4 cuts and are likewise furnished with a slide frame and 4 temper screws to give the saws the proper degree of tension.

A still more simple mode of sawing square stone by gang saws driven by any kind of power at pleasure consists in having them set in a plain saw frame such as the other gang saw frame without any superincumbent frame or machinery but guided entirely in its descent by the application of turned rollers and moved by a double or jointed pitman acting in a grooved block which pitman block is elevated or depressed by an elevating screw placed at each corner of the pitman block so as to keep the pitman block at all times nearly on a level with the descent of the saws in their progress through the stone. See Fig. 6.

I do not claim as my invention the gang of saws, the belt, or endless saws, nor the hoop or cylinder saw, as my invention, as they have long since been used for cutting various materials; nor do I claim the use of rollers simply for the purpose of guiding the saws in their longitudinal motions; but, What I do claim as my invention and improvements and which I desire to secure by Letters Patent is—

1. The employment of sets of rollers placed on each side of the straight and belt or endless saws and at each end of the block of stone so arranged (as herein described) as to guide the saws in their rise and fall they having also the effect of guiding them in their longitudinal motions.

2. The method of feeding the belt or endless saws by allowing the drums B, B, B, B, around which they revolve to slide on their spindles F, F, F, F, as herein described, the drums being worked either by cog wheels as described or by belts.

3. The method of feeding the hoop or cylinder saws by allowing the drum or hub to which it is attached to slide up and down on the spindle around which it rotates as herein described.

4. The method of sawing round blocks of stone or columns by means of cylindrical saws fixed to a skeleton frame having simultaneously a rotary and a vertical motion as herein described.

DAVID V. RANNELLS.

Witnesses:
WM. P. ELLIOT,
EDMUND MAHER.